United States Patent
Milstein

(10) Patent No.: US 9,116,884 B2
(45) Date of Patent: Aug. 25, 2015

(54) SYSTEM AND METHOD FOR CONVERTING A MESSAGE VIA A POSTING CONVERTER

(75) Inventor: David Milstein, Redmond, WA (US)

(73) Assignee: INTELLISIST, INC., Seattle, WA (US)

(*) Notice: Subject to any disclaimer, the term of this patent is extended or adjusted under 35 U.S.C. 154(b) by 497 days.

(21) Appl. No.: 12/960,392

(22) Filed: Dec. 3, 2010

(65) Prior Publication Data

US 2011/0135071 A1 Jun. 9, 2011

Related U.S. Application Data

(60) Provisional application No. 61/266,969, filed on Dec. 4, 2009.

(51) Int. Cl.
*H04M 11/00* (2006.01)
*G06F 17/28* (2006.01)
*G06Q 10/10* (2012.01)
*H04L 12/58* (2006.01)

(52) U.S. Cl.
CPC ............ *G06F 17/2872* (2013.01); *G06Q 10/10* (2013.01); *G06Q 10/107* (2013.01); *H04L 12/583* (2013.01); *H04L 12/5835* (2013.01); *H04L 51/063* (2013.01); *H04L 51/066* (2013.01)

(58) Field of Classification Search
CPC ................ H04M 1/72547; H04M 1/72527; H04M 1/7253; H04M 1/7255; H04M 2201/60; H04M 7/0045; H04M 15/00; H04M 15/90; H04M 2201/54; H04M 2203/052; H04M 2203/4536
USPC ........................................... 379/88.01–88.16
See application file for complete search history.

(56) References Cited

U.S. PATENT DOCUMENTS

| | | | |
|---|---|---|---|
| 5,687,220 A * | 11/1997 | Finnigan | 379/88.22 |
| 6,334,103 B1 | 12/2001 | Surace et al. | |
| 6,401,061 B1 | 6/2002 | Zieman | |
| 6,459,892 B2 | 10/2002 | Burgan et al. | |
| 6,487,277 B2 | 11/2002 | Beyda et al. | |
| 6,668,169 B2 | 12/2003 | Burgan et al. | |

(Continued)

FOREIGN PATENT DOCUMENTS

| | | |
|---|---|---|
| DE | 103 37 822 | 3/2004 |
| EP | 1 988 670 | 11/2008 |

(Continued)

OTHER PUBLICATIONS

Aw et al., "A Phrase-Based Statistical Translation Model for SMS Text Normalization," Proceedings of the 21st International Conference on Computational Linguistics and 44th Annual Meeting of the Association for Computational Linguistics, pp. 33-40, Sydney, Australia, Jul. 17-Jul. 21, 2006.

*Primary Examiner* — Duc Nguyen
*Assistant Examiner* — Assad Mohammed
(74) *Attorney, Agent, or Firm* — Patrick J.S. Inouye; Leonid Kisselev; Krista A. Wittman

(57) ABSTRACT

A system and method for converting a message via a posting converter is provided. At least one incoming message is received from a composition device. Characteristics of the message are determined. The characteristics include a target device to which the message is directed and an application through which the message will be presented. An appropriate template is selected for the message based on at least one of the message characteristics. The message is converted to a different format using the selected template. The converted message is provided for display on the target device.

16 Claims, 5 Drawing Sheets

(56) References Cited

U.S. PATENT DOCUMENTS

| | | | |
|---|---|---|---|
| 6,757,531 B1 | 6/2004 | Haaramo et al. | |
| 6,778,660 B2 | 8/2004 | Fromm | |
| 6,876,728 B2* | 4/2005 | Kredo et al. | 379/88.17 |
| 6,917,799 B2 | 7/2005 | Ross et al. | |
| 6,981,021 B2 | 12/2005 | Takakura et al. | |
| 7,123,719 B2 | 10/2006 | Sowa et al. | |
| 7,170,863 B1 | 1/2007 | Denman et al. | |
| 7,522,911 B2 | 4/2009 | Ung et al. | |
| 7,756,936 B2* | 7/2010 | Rosenberg et al. | 709/206 |
| 7,983,910 B2* | 7/2011 | Subramanian et al. | 704/250 |
| 8,447,285 B1* | 5/2013 | Bladon et al. | 455/414.4 |
| 2001/0053977 A1 | 12/2001 | Schaefer | |
| 2002/0006126 A1 | 1/2002 | Johnson et al. | |
| 2002/0077823 A1 | 6/2002 | Fox et al. | |
| 2002/0141560 A1 | 10/2002 | Khayatan et al. | |
| 2002/0188670 A1 | 12/2002 | Stringham | |
| 2004/0122979 A1* | 6/2004 | Kirkland | 709/247 |
| 2004/0162724 A1 | 8/2004 | Hill et al. | |
| 2005/0197843 A1 | 9/2005 | Faisman et al. | |
| 2006/0193450 A1* | 8/2006 | Flynt et al. | 379/88.13 |
| 2008/0059152 A1* | 3/2008 | Fridman et al. | 704/9 |
| 2008/0076453 A1 | 3/2008 | Cai et al. | |
| 2008/0126481 A1 | 5/2008 | Chakra et al. | |
| 2009/0144392 A1* | 6/2009 | Wang et al. | 709/217 |
| 2010/0169434 A1* | 7/2010 | Lind et al. | 709/206 |
| 2011/0116610 A1* | 5/2011 | Shaw et al. | 379/88.04 |

FOREIGN PATENT DOCUMENTS

| | | |
|---|---|---|
| WO | 0030374 | 5/2000 |
| WO | 0147218 | 6/2001 |
| WO | 2006101428 | 9/2006 |
| WO | 2007097598 | 8/2007 |
| WO | 2008084207 | 7/2008 |

* cited by examiner

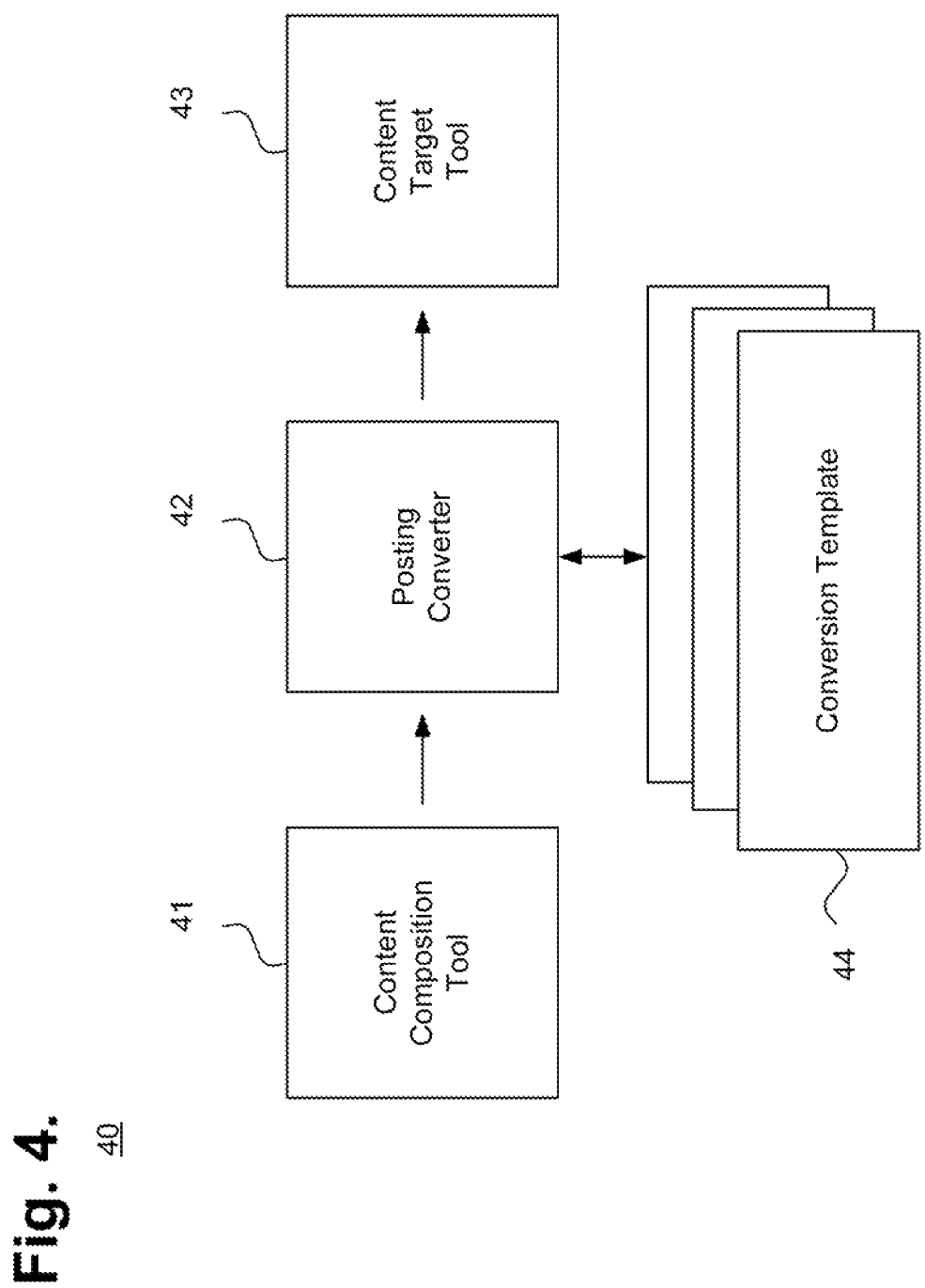

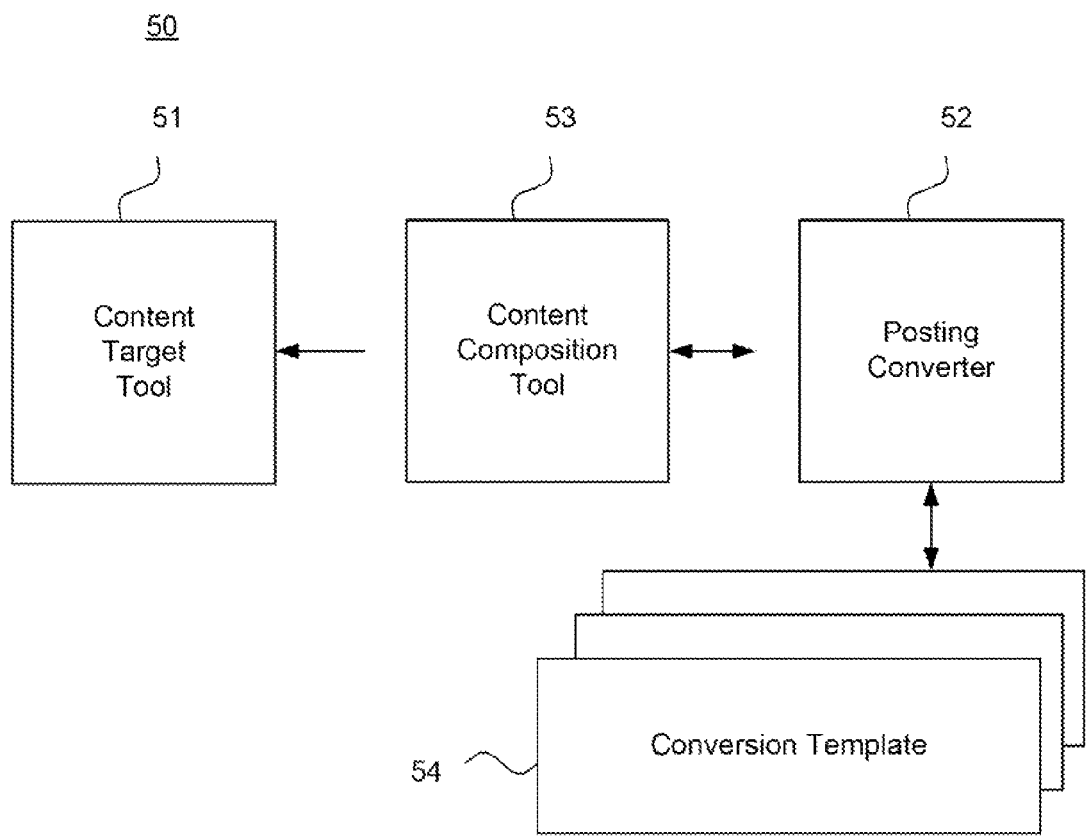

SYSTEM AND METHOD FOR CONVERTING A MESSAGE VIA A POSTING CONVERTER

CROSS-REFERENCE TO RELATED APPLICATION

This non-provisional patent application claims priority under 35 U.S.C. §119(e) to U.S. Provisional Patent Application, Ser. No. 61/266,969, filed Dec. 4, 2009, the disclosure of which is incorporated by reference.

FIELD

The present invention relates in general to message-based voice communications and, in particular, to a system and method for converting a message via a posting converter.

BACKGROUND

Social and inter-personal communication tools have been enriched by technologies like SMS, MMS, and speech to text, as well as web services and websites such as Twitter, Facebook and MySpace. Currently, inter-personal communication and social networking are extremely popular with users of all ages. This phenomenon is not showing signs of a slow down.

Users of these inter-personal and social communications technology tools often develop a common communication style that can style can differ across different technology tools and environments or alternatively, within the same tools and environments. Factors for a change in communication style include age group, geographic location of the users, and local group, such as a school or club. Communication between different tools or environments is not always effective or accurate. For example, messages sent as an email, but received as a text, are often incomplete due to the size limit imposed on text messages. Accordingly, users are required to adapt based on the device, application, or service used. Common methods of adaptation include word shortcuts, word replacements, icons, and emoticons, as well as more abstract writing styles based on the technology tool or service. For instance, on Twitter, a user is limited to postings of 140 words, while no such limit is imposed on Facebook.

The shortcuts can include abbreviations, acronyms, emoticons, or graphics, as well as other shortcuts. For example, the digit 2 can be used in place of the words 'to' or 'too' when sending an SMS (Short Message Service) message. In a further example, children and teenagers might use the short code PIR, which stands for Parent In Room, or POS, which stands for Parent Over Shoulder when communicating with friends on Instant Messenger ("IM") to warn their friends that a parent is near. Additionally, on Twitter, users may use the shortcut FF, which stands for Follow Friday, to suggest to their readers, other tweets and twitters to view and follow.

At the same time, there is a growing variety of tools that people can use to post content or send messages using the above described communication tools. For example, one can post entries (known as tweets) by various ways, such as accessing the Twitter website directly using a web browser, by using a variety of Personal Computer widgets, or by sending SMS messages to a predefined address. One could send SMS messages to other mobile phone users, by using a mobile phone, by using a web service, or by sending an email to a predefined email address typically provided by mobile operators.

A system and method to allow users of various communication tools and environments to bridge between their typical communication style, the capabilities of the device or method they are using to send a given message or post a given posting, and the expected style and grammar of the target communication tool or environment is needed.

SUMMARY

A posting converter converts a message from one format to another based on many factors, including an environment in which the message was generated and an environment in which the message is presented. Once composed on a conversion tool, the message is transmitted to the posting converter, which identifies one or more templates for converting the message. The converted message is then transmitted to a target tool and presented.

An embodiment provides a system and method for converting a message via a posting converter. At least one incoming message is received from a composition device. Characteristics of the message are determined. The characteristics include a target device to which the message is directed and an application through which the message will be presented. An appropriate template is selected for the message based on at least one of the message characteristics. The message is converted to a different format using the selected template. The converted message is provided for display on the target device.

A further embodiment provides a system and method for converting message content. Incoming messages are received via a first application. A template is selected for converting at least one of the incoming messages for display using a different application. The different application is associated with guidelines for presentation of the incoming message. Content of the incoming message is converted to comply with the presentation guidelines of the different application via the selected template. The converted message is provided for presentation via the different application.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a flow diagram showing, by way of example, a message flow from a composition tool to a target tool.

FIG. 5 is a flow diagram showing, by way of example, an alternative message flow from a composition tool to a target tool.

DETAILED DESCRIPTION

Converter System

As social networking and electronic communications increase, communication standards become dependent on a particular method, device, or application in which the communication in transmitted. Thus, each different means for communication can be associated with different communication standards, which can make transmission of a message from one communication tool to another, awkward. A posting converter allows users to bridge different communication tools for transmitting messages regardless of the different communication styles.

Figure 1:
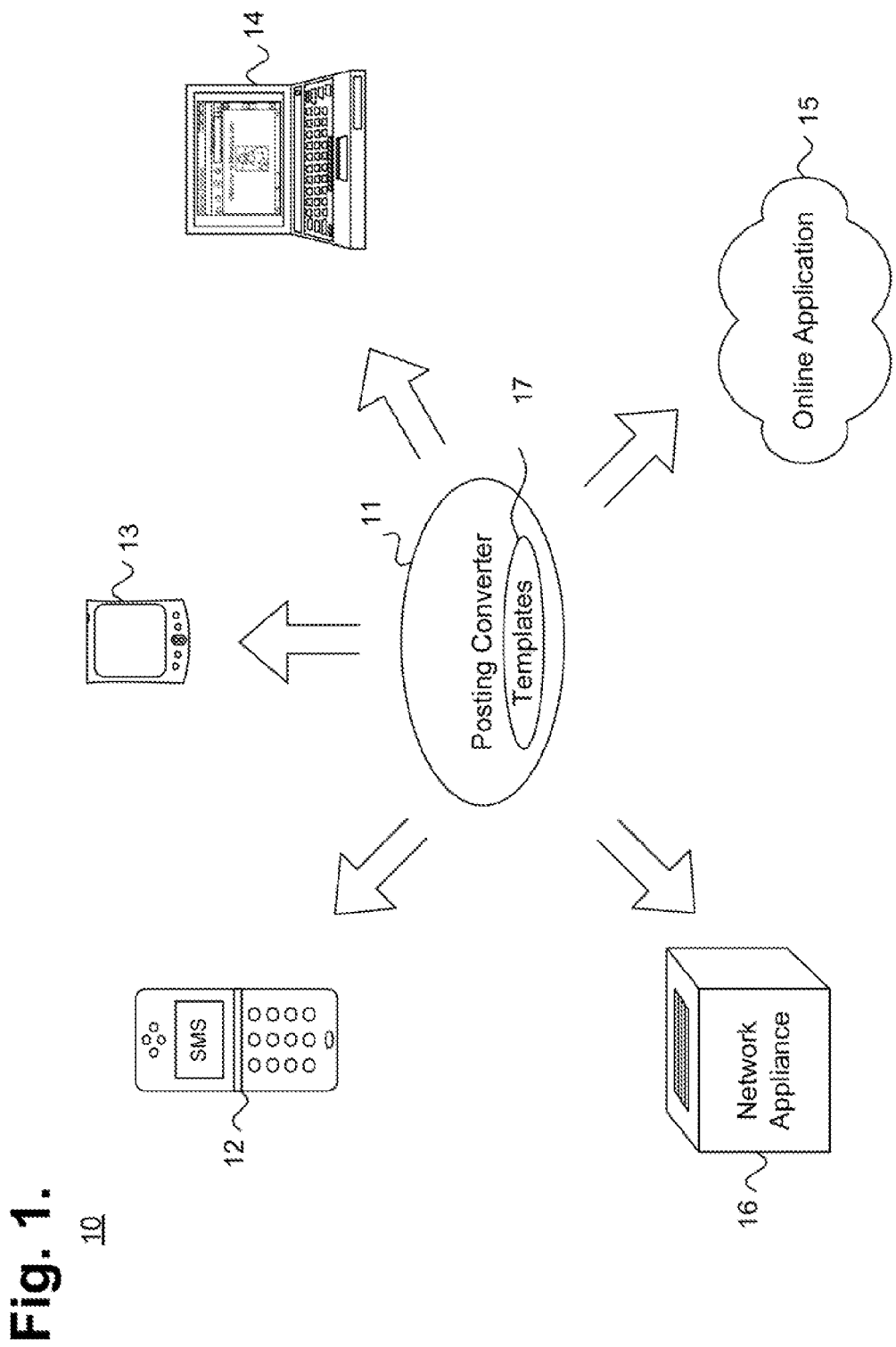
FIG. 1 is a block diagram showing a system for converting a message via a posting converter, in accordance with one embodiment.

FIG. 1 is a block diagram showing a system 10 for converting text via a posting converter, in accordance with one embodiment. The posting converter 11 can communicate with multiple communication tools 12-14, including personal communication devices (PCDs) and applications or services running on or by the communication tools. The PCDs include telephones 12, PDAs 12, and personal computers 14. The applications can include Facebook, Twitter, Instant Messenger (IM), and Myspace, as well as other applications. The services can include a voice to text service that allows users to send voice messages for conversion into text. The voice to text service can also be provided on the PCD itself as further described below with reference to FIG. 2. Other tools, PCDs, applications, and services are possible. Each of the communication tools 12-14 can function as a composition tool or a target tool. The composition tool can compose a message directed to one or more target tool. The message can include a voice message, SMS text message, wall posting, or IM, which is transmitted from the composition tool 12-14 to the posting converter 11.

The posting converter can be a stand-alone application that is located on and run by the composition and target tools, as well as an online service 15, or an application running on a network appliance 16. The posting converter can include conversion templates, which each include information on content conversion rules, style, and graphical elements, as well as age, language, and preference dependent conversion resources. Such preferences can be passed to the posting converter with the content or separately, at the time of conversation or on a prior occasion. Alternatively, the conversion templates can be stored separately from the posting converter, such as on the composition tools, target tools, or other tools.

Once received, the posting converter 11 identifies characteristics of the message, such as the type of target to which the message is directed, an environment in which the message will be delivered, a sender of the message, and a recipient of the message. Other characteristics are possible. The identified characteristics can be used to locate applicable templates for converting the message from the current format to a different format that is more appropriate to the environment, user, or device type of the target tool. The converted message is then transmitted to the target tool. Other configurations, topologies, and arrangements of the above-identified system are feasible, as would be recognized by one skilled in the art.

The composition and target tools, and network appliances can be general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Personal Communication Device

Figure 2:
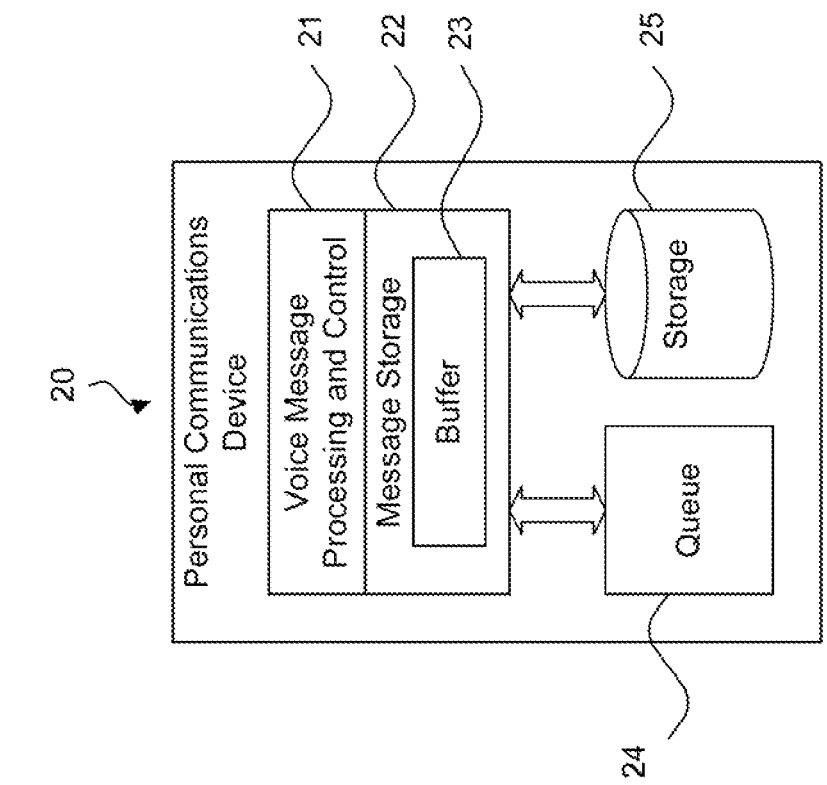
FIG. 2 is a block diagram showing the logical structure of a PCD for use in the system of FIG. 1.

The conversion and target tools can include PCDs with a voice to text engine for receiving voice messages from a user and converting the voice message to text prior to transmission of the message to the posting converter. FIG. 2 is a block diagram showing the logical structure 20 of a PCD 11 for use in the system 10 of FIG. 1. The PCD is functionally divided into a voice message processing and control module 31 and message storage module 32. The voice message processing and control module 31 includes logic for converting analog voice signals into digitized form, managing message queuing and storage, and controlling voice processing functions, including standby and active modes activated via an "Attention" button. The message storage module 32 includes a message buffer 33 for assembling outgoing voice messages, a message queue 34 for transitorily storing voice messages, and a message store 35 for persistently storing received voice messages. Other types of PCDs with voice to text capabilities are possible.

In a further embodiment, a voice message can be generated on a PCD and transmitted to a remote service center for conversion to text. Once converted, the message is then transmitted to the posting converter for further conversion into an appropriate format for presentation on a target tool. The posting converter can he located at or within the remote service center, or external to the remote service center.

In yet a further embodiment, the remote service center can include a call center, which receives calls from users. Each user can relay a voice message to a recording system or live agent for conversion to text. Once converted, the text is then transmitted to the posting converter for further conversion into an appropriate format for presentation on a target tool. The posting converter can be located at the call center or external to the call center.

Converting Messages

Figure 3:
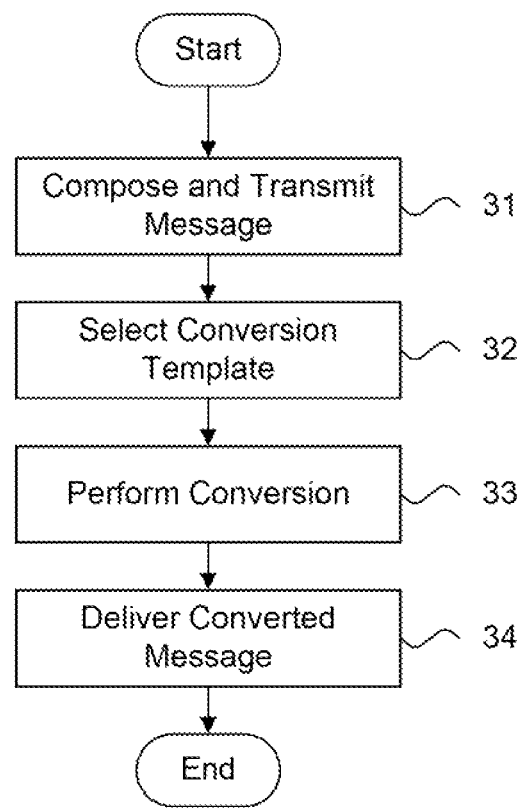
FIG. 3 is a flow diagram respectively showing a method for converting a message via a posting converter, in accordance with one embodiment.

Converting messages allows a user to transmit a message from a composition tool in one format for presentation to a target tool in a different format. FIG. 3 is a flow diagram respectively showing a method 30 for converting a message via a posting converter, in accordance with one embodiment. A message is composed by a composition tool and transmitted (block 31) to a posting converter. The message can be transmitted with a designation of one or more target tools to which the message is directed. The posting converter identifies one or more appropriate templates (block 32) for converting the message. The templates can be selected based on characteristics, such as the target tool, sender and recipient attributes, common attributes of the sender and recipient, and an environment surrounding the target tool. The attributes can include age, state of mind, language, style, preferences, social groups, organizations, memberships, or social network. Other attributes and methods for identifying templates are possible. Once identified, the conversion is performed using the template as a guide (block 33). The converted message is then transmitted to a target tool (block 34). Delivery of the converted message can occur through a local or remote file system, using an operating system Application Programming Interface call, using Web technology, such as HTTP POST, using mobile technology, or as an SMS or MMS message transmitted from a PCD.

The posting converter can communicate with both the conversion tool and target tool for relaying the message. FIG. 4 is a flow diagram showing, by way of example, a message flow 40 from a composition tool 41 to a target tool 43. A composition tool 41 composes a message that is directed to a target tool 43. A determination is made as to whether any processing of the message is required prior to transmission. For example, a user records a voice message on the composition tool for posting a tweet on Twitter. The voice message includes "bought one before I left for Las Vegas." Prior to transmission to a posting converter 42, the voice message is processed for converting to a text message. The voice to text conversion can occur on the composition tool or another tool. In a further embodiment, the voice message can be converted to text using the posting converter 42.

After processing, if necessary, the text message is then transmitted to the posting converter 42, which identifies one or more templates 44 for converting the text message into a format appropriate for display by the target tool 43. The templates can be selected based on message characteristics, such as the target tool, application running on the target tool, sender and recipient attributes, common attributes of the sender and recipient, and an environment surrounding the target tool. Returning to the above example, the text message is received by the posting converter 42, which identifies a template for the message based on the application, Twitter.

Currently, Twitter tweets are limited to 140 characters. Accordingly, a wide variety of abbreviations and acronyms are used so that more information can be provided in a single tweet. A template for converting the original voice message to a tweet can include rules for abbreviating the terms "one," "before," "for," and "Las Vegas." Other abbreviations are possible. The converted message now appears as "bought 1 b4 I left 4 LV," which greatly reduces the number of characters. The text message is then transmitted to the target tool 43 for presentation via Twitter.

In a further example, the voice message can be converted to an emoticon for posting on a recipient's wall in Facebook. The voice message can include "thanks smiley face." The posting converter identifies a template for Facebook and converts the message to "thanks ☺." The converted message is transmitted to the recipient's Facebook page and posted on the wall. The emoticons can be identified based on a phrase, code, name, or identification number. Other methods for identifying emoticons are possible.

Other examples for converting the format of a message are possible, including filling out the content of a message, such as a tweet, for display using an application, service, or tool that allows more characters or content than Twitter. In this example, abbreviations located in the tweet can be expanded to include full text for easier reading by a recipient.

In a further embodiment, the posting converter may only communicate with the conversion tool. FIG. 5 is a flow diagram showing, by way of example, an alternative message flow 50 from a composition tool 53 to a target tool 51. A message is composed on the composition tool 53. Any processing, if necessary, is performed on the message, which is then transmitted to the posting converter 52. The posting converter 52 identifies characteristics of the message to locate an appropriate template 54. Once located, the message is converted and transmitted back to the composition tool 53, which then transmits the message to the target tool 51.

In yet a further embodiment, the message is composed using more than one composition tool. For example, a voice message can be combined with a text message for transmitting to the posting converter. However, prior to transmission, the voice message can be converted to text and then the converted voice message is combined with the test message for sending to the posting converter.

In yet a further embodiment, the converted message can be transmitted to more than one target tool. For example, a user may wish to compose a message for posting on Twitter and sending as a text to one or more recipients. The list of recipients can be predetermined or selected by a user, such as from an address book or friend list.

While the invention has been particularly shown and described as referenced to the embodiments thereof, those skilled in the art will understand that the foregoing and other changes in form and detail may be made therein without departing from the spirit and scope of the invention.

What is claimed is:

1. A system for converting a message, comprising:
 a message converter, comprising:
  a message receiver to receive a voice message composed at a composition device associated with a user and directed to one or more social networking sites associated with the user;
  a voice-to-text converter to convert the voice message into a text message directed to the one or more social networking sites associated with the user;
  a message analyzer to determine one or more types of the social networking sites to which the text message is directed;
  an identifier to identify guidelines for presentation of the text message for the types of the social networking sites, the guidelines comprising a size limit for the presentation;
  a template selector to select one or more appropriate templates for the text message based on the guidelines; and
  a format converter to convert the text message to at least one different format compliant with the size limit using the one or more selected templates via at least one of abbreviating one or more words of the text message, replacing the one or more words of the text message, and converting the one or more words into emoticons and to post the converted text message at the one or more social networking sites;
  a guidelines identifier to identify further guidelines for displaying the text message posted on the one or more social networking sites using an application not associated with the size limit;
  a further template selector to select one or more additional templates for the posted text message based on the application guidelines; and
  a further converter to convert the posted text message to another format using the one or more additional templates comprising increasing a number of characters of the posted text message comprising expanding the abbreviations into complete words; and
 a processor to execute the message converter.

2. A system according to claim 1, wherein the voice message is a voice recording or a real-time voice stream.

3. A system according to claim 1,
 wherein the conversion to the at least one different format is further performed via including icons.

4. A method for converting a message, comprising the steps of:
 receiving a voice message composed at a composition device associated with a user and directed to one or more social networking sites associated with the user;
 converting the voice message into a text message directed to the one or more social networking sites associated with the user;
 determining one or more types of the social networking sites to which the text message is directed;
 identifying guidelines for presentation of the text message for the types of the social networking sites, the guidelines comprising a size limit for the presentation;

selecting one or more appropriate templates for the text message based on the guidelines;

converting the text message to at least one different format compliant with the size limit using the one or more selected templates via at least one of abbreviating one or more words of the text message, replacing the one or more words of the text message, and converting the one or more words into emoticons;

posting the converted text message at the social networking sites;

identifying further guidelines for displaying the text message posted on the one or more social networking sites using an application not associated with the size limit;

selecting one or more additional templates for the posted text message based on the application guidelines;

converting the posted text message to another format using the one or more additional templates comprising increasing a number of characters of the posted text message comprising expanding the abbreviations into complete words, wherein the steps are performed by a suitably-programmed computer.

5. A method according to claim 4, wherein the voice message is a voice recording or a real-time voice stream.

6. A method according to claim 4, wherein the conversion to the at least one different format is further performed via including icons.

7. A system for converting message content, comprising:

a message converter, comprising:

a message receiver to receive via a first application a voice message composed at a composition device associated with a user and directed to at least one social networking site associated with the user;

a voice-to-text converter to convert the voice message into a text message directed to the one or more social networking sites associated with the user;

an identifier to identify at least one different application for displaying the text message at the one or more social networking sites, wherein the at least one different application is associated with guidelines for presentation of the text message, the guidelines comprising a size limit for the presentation;

a template selector to select at least one template for converting the text message for display at the at least one social networking site using the at least one different application; and a format converter to convert the text message to comply with the size limit of the at least one different application in accordance with the at least one selected template via at least one of abbreviating one or more words of the text message, replacing the one or more words of the text message, and converting the one or more words into emoticons and to provide the converted text message for the presentation at the at least one social networking site via the different application;

a guidelines identifier to identify further guidelines for displaying the text message provided on the one or more social networking sites using a further application not associated with the size limit;

a further template selector to select one or more additional templates for the posted text message based on the further application guidelines; and a further converter to convert the posted text message to another format using the one or more additional templates comprising increasing a number of characters of the posted text message comprising expanding the abbreviations into complete words; and a processor to execute the message converter.

8. A system according to claim 7, wherein the conversion to comply with the size limit is further performed via including icons.

9. A system according to claim 7, wherein the voice message is a voice recording or a real-time voice stream.

10. A method for converting message content, comprising the steps of:

receiving via a first application a voice message composed at a composition device associated with a user and directed to at least one social networking site associated with the user;

converting the voice message into a text message directed to the one or more social networking sites associated with the user;

identifying at least one different application for displaying the text message at the one or more social networking sites, wherein the at least one different application is associated with guidelines for presentation of the text message, the guidelines comprising a size limit for the presentation;

selecting at least one template for converting the text message for display using the different application;

converting the text message to comply with the size limit of the at least one different application in accordance with the at least one selected template via at least one of abbreviating one or more words of the text message, replacing the one or more words of the text message, and converting the one or more words into emoticons; and providing the converted text message for the presentation via the different application at the at least one social networking site;

identifying further guidelines for displaying the text message provided on the one or more social networking sites using a further application not associated with the size limit;

selecting one or more additional templates for the presented text message based on the further application guidelines; and converting the posted text message to another format using the one or more additional templates comprising increasing a number of characters of the posted text message comprising expanding the abbreviations into complete words, wherein the steps are performed by a suitably-programmed computer.

11. A method according to claim 10, wherein the conversion to comply with the size limit is further performed via including icons.

12. A method according to claim 10, wherein the voice message is a voice recording or a real-time voice stream.

13. A system according to claim 1, further comprising:

a different message receiver to receive a different text message directed to the one or more social networking sites;

a message combiner to combine the received different text message with the voice message, wherein the text message comprises the different text message and the converted voice message.

14. A method according to claim 4, further comprising:

receiving a different text message directed to the one or more social networking sites;

combining the received different text message with the voice message, wherein the text message comprises the different text message and the converted voice message.

15. A system according to claim 7, further comprising:
a different message receiver to receive a different text message directed to the one or more social networking sites;
a message combiner to combine the received different text message with the voice message, wherein the text message comprises the different text message and the converted voice message.

16. A method according to claim 10, further comprising:
receiving a different text message directed to the one or more social networking sites;
combining the received different text message with the voice message, wherein the text message comprises the different text message and the converted voice message.

* * * * *